United States Patent [19]

Pierce et al.

[11] Patent Number: 5,063,132

[45] Date of Patent: Nov. 5, 1991

[54] XEROGRAPHIC PHOTOTYPESETTING SYSTEM AND TONER USEFUL THEREIN

[75] Inventors: Zona R. Pierce, Rochester; Dinesh Tyagi, Fairport; John C. Wilson, Rochester, all of N.Y.

[73] Assignee: Eastman Kodak Company, Rochester, N.Y.

[21] Appl. No.: 434,379

[22] Filed: Nov. 13, 1989

[51] Int. Cl.$^5$ .......................... G03G 9/00; G03G 5/00
[52] U.S. Cl. .................................. 430/109; 430/106; 430/137
[58] Field of Search .................. 430/106, 109, 137

[56] References Cited

U.S. PATENT DOCUMENTS

| | | | |
|---|---|---|---|
| 4,100,321 | 7/1978 | Schlesinger et al. | 430/144 |
| 4,661,566 | 4/1987 | Pruett et al. | 528/274 X |
| 4,788,121 | 11/1988 | Moore | 430/106 |
| 4,833,056 | 5/1989 | Bhateja et al. | 430/106.6 |
| 4,855,396 | 8/1989 | Wilson et al. | 430/106 X |

FOREIGN PATENT DOCUMENTS 52-049837  4/1977  Japan .

OTHER PUBLICATIONS

Kitamura et al., "High-Speed Platemaking by Coupling of a Conventional Presensitized Plate and an Electrophotographic Layer", Photographic Science and Engineering, vol. 26, No. 3, May/Jun. 1982.

*Primary Examiner*—Marion E. McCamish
*Assistant Examiner*—S. C. Crossan
*Attorney, Agent, or Firm*—Dressler, Goldsmith, Shore, Sutker & Milnamow, Ltd.

[57] ABSTRACT

A toner composition and a xerographic process for making lithographic plates using the toner composition is provided. The toner composition can be prepared in the form of a dry powder, a polymeric limited coalescence composition, or an evaporative limited coalescence composition. The toner composition absorbs light in the frequency range of 300 to 450 nm and has a total transmission density of at least about 3 at a stack height of about 10 microns. Positive transparencies are produced with imaged areas formed from the toner composition using conventional photocomposing. The transparencies are then employed for contact exposing of positive-working lithographic plates with light, and the plates are then developed.

9 Claims, No Drawings

XEROGRAPHIC PHOTOTYPESETTING SYSTEM AND TONER USEFUL THEREIN

FIELD OF THE INVENTION

This invention is in the field of photolithographic plates using a xerographic process and an ultraviolet light absorbing toner.

BACKGROUND OF THE INVENTION

Photographic typesetting is commonly and conventionally used in the graphic arts industries as a technique for generating lithographic impressions.

So far as now known, the making of lithographic plates by a xerographic process using an ultraviolet light (UV) absorbing toner and a UV photosensitive plate has not been successful. A conventional xerographic toner powder, such as commonly employed in xerographic office document copying equipment, cannot readily be used for these purposes because dry toners contain a low concentration of pigment. Thus, their optical densities are too low to provide an effective contact mask when an intensive UV source is being used for imaging. Furthermore, the making of a xerographic high contrast negative mask in conventional lithographic photomaking processes requires efficient transfer of large solid areas which is difficult to achieve without pinholes or other defects.

These problems become acute when color reproductions are contemplated. Multiple separation transparencies must be prepared and used to prepare different lithographic plates for each color.

Lithographic plate making requires a toner which will provide a high transmission density to prevent defects in plates caused by light penetration through toned areas in a transparency. Thus, new toners and processing techniques are needed to manufacture transparencies suitable for use in making lithographic plates.

SUMMARY OF THE INVENTION

This invention provides a method for making lithographic plates comprising the steps of:

electrophotographically forming a positive transparency whose image is derived from a desired photocomposition and which is formed from a toner composition which absorbs ultraviolet light and has a high total transmission density;

imaging a lithographic plate which is sensitive to ultraviolet light; and developing the exposed plate.

This invention also provides a toner composition having ultraviolet light absorbing capacity and the capacity to provide, when laid down on a transparency, a high total transmission density.

The toner compositions of this invention comprise on a 100 weight percent basis:

(a) about 80 to about 99.5 weight percent of at least one polyester which contains incorporated into the polymer structure thereof based on the total acid or hydroxy monomers about 0.1/99.9 to about 100.0/0 mole ratio of at least one methine dye having a spectral absorption peak in the range of about 300 to about 450 nm;

(b) about 0.0 to about 20.0 weight percent of at least one pigment; and (c) about 0.05 to about 5.0 weight percent of at least one charge control agent wherein the toner composition has a total transmission density of at least about 3 at a stack height of 10 microns.

One skilled in the art will appreciate that, except where otherwise indicated, the mole ratios set forth herein apply to difunctional dyes. For example, if monofunctional dyes are utilized, the mole ratios will be in the range of about 0.1/99.95 to about 100.0/0.

The invention further provides a positive transparency having images formed on one surface thereof that absorbs ultraviolet light and has high total transmission density.

In one mode of practicing the invention, electrophotographic typesetting is accomplished. In another mode of practicing the invention, lithographic color reproduction is accomplished. The ultraviolet light absorbing toner composition of the present invention achieves high total transmission density on transparency surfaces and increases the ultraviolet light absorption efficiency while the level of pigment in the toner composition can be maintained at relatively low levels.

Various other features, advantages, aims, embodiments, and the like of this invention will be apparent to those skilled in the art from the present specification and appended claims.

DETAILED DESCRIPTION

The Toner Composition

Toner compositions of this invention comprise on a 100 weight percent basis:

(a) about 80.0 to about 99.5 weight percent of at least one polyester which contains incorporated into the polymer structure thereof about 0.1/99.9 to about 100.0/0.0 mole ratio based on the total acid or hydroxy monomers of at least one methine dye having a spectral absorption peak in the range of about 300 to about 450 nm;

(b) about 0.5 to about 20 weight percent of at least one pigment; and (c) about 0.05 to about 5 weight percent of at least one charge control agent wherein the toner composition has a total transmission density of at least about 3 at a stack height of 10 microns.

A polyester having such an incorporated dye can have various structures.

For example, a class of dye containing polyesters suitable for use in the practice of the present invention is as follows:

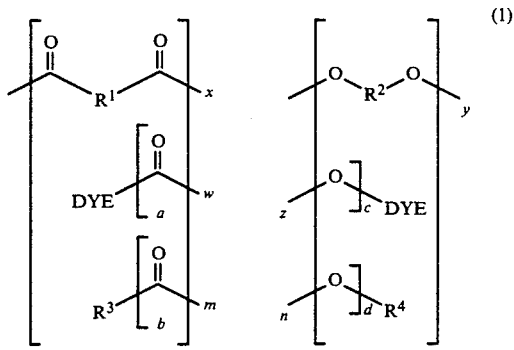

wherein:

$R^1$ and $R^2$ are each an aromatic radical or an aliphatic radical and more than one $R^1$ or $R^2$ radical may be present in the same structure;

DYE is any UV absorbing acid or alcohol moiety;

$R^3$ and $R^4$ are each an aromatic radical or an alphatic radical;

a, b, c and d are each an integer of 1 through 6 inclusive; and w, x, y, z, m and n are each a mole ratio. x, y, and w and/or z must always have values equal to or greater than 0.

A generic formula for a preferred class of dye containing polyesters suitable for use in the practice of this invention is as follows:

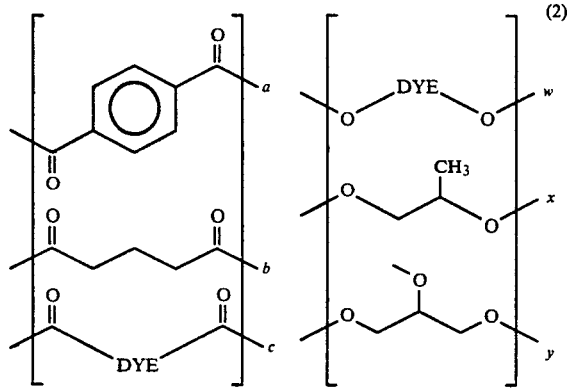

(2)

wherein:

DYE is as shown defined in Formula (1): and x, m, w, y, and n are each as described above.

A dye residue can be either in the acid or the hydroxy segment (or residue) of a polymer. Although in the generic formulae herein the dye has been illustrated as difunctional, it will be appreciated that the functionality of the dye can also be mono-, tri-, tetra-, and higher. The presence of a branching agent is optional.

Illustrative of polyesters useful in the practice of the invention are polyesters of the above general formulae which contain dye moieties derived from dyes having the structures listed in the following Table 1. Other examples of dyes can be found in U.S. Pat. Nos. 4,617,373; 4,617,374; 4,661,566; and 4,707,537.

It is presently preferred to employ amorphous thermoplastic polyesters wherein, as an integral part of the polymer backbone or chain, certain ultraviolet (UV) light absorbing residues are incorporated. These residues are derived from methine dye compounds which are reacted with the polymer precursors, i.e., monomers. These methine compounds are characterized by the formula:

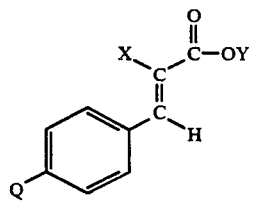

(3)

wherein:

Y is a lower alkyl group;

X is selected from the group consisting of —CN and

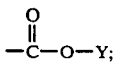

and

Q is selected from the group consisting of —NH$_2$, —NHY, —N(Y)$_2$ and

(4)

These polyesters have an inherent viscosity (i.v.) in the range of about 0.05 to about 0.80, preferably about 0.10 to about 0.60 in methylene chloride solution at a concentration of 0.25 grams of polymer per 100 milliliters of solution. The polymers preferably have a branched chain structure.

The total quantity of methine compound residues present in the polyesters of this invention is in the range of about 0.1/99.9 to about 100.0/0.0 mole ratio based on the total acid or hydroxy monomers and, preferably, about 0.5/99.5 to about 50.0/50.0 mole ratio when the dye is difunctional.

Presently preferred polyesters used in this invention contain both phthalic acid residues of the formula:

(5)

where $\phi$ is a phenylene nucleus that is substituted in the 1 and 2-positions, the 1 and 3-positions, or the 1 and 4-positions, by and polyol residues of the formula

(6)

where R is a lower alkylene group, a di(lower alkylene) substituted cycloalkylene group, a difunctional cycloalkyl group, a lower alkylene group containing at least one incorporated oxo atom (preferably —CH$_2$—CH$_2$—O—CH$_2$—CH$_2$—), or a lower alkylene group containing at least one pendant oxy (—O—) atom (preferably

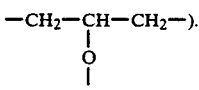

A polyester polymer of this invention has a glass transition temperature (T$_g$) in the range of about 50° to about 120° C., preferably about 60° to about 70° C.

The term "glass transition temperature" (T$_g$) as used herein means the temperature at which a polymer material changes from a glassy polymer to a rubbery polymer. This temperature (T$_g$) can be measured by differential thermal analysis as disclosed in Techniques and Methods of Polymer Evaluation, Vol. 1 Marcel Dekker, Inc., N.Y., 1966.

The polymers of the present invention can be dispersed in polymeric binders such as styrene butylacrylate, styrene butylmethacrylate and styrene butadiene copolymers.

Toner particles made from the polymers of the present invention are capable of absorbing ultraviolet light, such as the light used, in phototypesetting, and in the preparation of lithographic plates from transparencies, such as color separation transparencies. The toner compositions of the present invention can also contain various additives, such as, for example, carrier particles (magnetic or nonmagnetic), carrier liquids, low surface energy liquids, colorants, and the like. Toner particles (or powders) made with polymers of the present invention are readily fusible to sheet members, such as a transparent polyethylene terephthalate film, or the like.

As used herein, the term "lower" before a named group, such as "alkyl" or "alkylene" means a group which contains less than 7 carbon atoms. A "lower alkyl" or a "lower alkylene" group can be a straight or branched chain.

The polyesters of this invention are prepared by reacting the usual types of polyester monomers with ultraviolet light absorbing methine compounds of Formula (3).

Monomers useful in preparing polyesters of this invention include any of those known to be useful in general to prepare polyester binders for toner particles. Some specific examples of such monomers are: 1,4-cyclohexanediol; 1,4-cyclohexanedimethanol; 1,4-cyclohexanediethanol; 1,4-bis(2-hydroxyethoxy)cyclohexane; 1,4-benzenedimethanol; 1,4-benzenediethanol; norbornylene glycol; decahydro-2,6-naphthalenedimethanol; glycerol; bisphenol A; ethylene glycol; diethylene glycol; triethylene glycol; 1,2-propanediol; 1,3-propanediol; 1,4-butanediol; 2,3-butanediol; 1,5-pentanediol; neopentyl glycol; 1,6-hexanediol; 1,7-heptanediol; 1,8-octanediol; 1,9-nonanediol; 1,10-decanediol; 1,12-dodecanediol; pentaerythritol; 2,2,4-trimethyl-1,6-hexanediol; 4-oxa-2,6-heptanediol; succinic acid; sebacic acid; 2-methyladipic acid; diglycolic acid; thiodiglycolic acid; fumaric acid; cyclohexane-1,3-dicarboxylic acid; cyclohexane-1,4-dicarboxylic acid; cyclopentane-1,3-dicarboxylic acid; 2,5-norbornanedicarboxylic acid; phthalic acid; isophthalic acid; terephthalic acid; 2-butylisophthalic acid; 2,6-naphthalenedicarboxylic acid; 1,4-naphthalenedicarboxylic acid; 1,5-naphthalenedicarboxylic acid; 4,4'-sulfonyldibenzoic acid; 4,4'-oxydibenzoic acid; binaphthyldicarboxylic acid; 9,10-triptycenedicarboxylic acid; and the anhydrides and lower alkyl esters of the acids mentioned.

Polyfunctional compounds having three or more carboxyl groups, and three or more hydroxyl groups, can also be employed. Various polyols or polyacids are conventionally used to create branching in the polyester chain, such as triols, tetraols, tricarboxylic acids or functional equivalents, and the like. Examples of such branching agents include pentaerythritol, 1,3,5-trihydroxyl pentane, 1,5-dihydroxy-3-ethyl-3-(2-hydroxy ethyl) pentane, trimethylolpropane, trimellitic anhydride, pyromellitic dianhydride, and the like. A presently preferred polyol is glycerol. Preferably up to about 10/(85 or less) mole ratio of the monomer mixture based on the total acid or hydroxy monomers is comprised of at least one polyol or polyacid containing three or more functional hydroxyl or carboxyl groups per molecule. The presence of the aforementioned branching agents will also affect the mole ratios specified herein.

In preferred methine compounds of Formula (3), Y is methyl or ethyl, and Q is —N(CH$_3$)$_2$ or

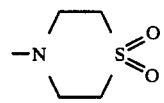

Presently preferred methine compounds of Formula (3) are represented by the following formula:

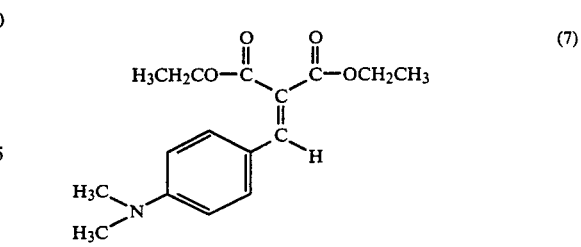

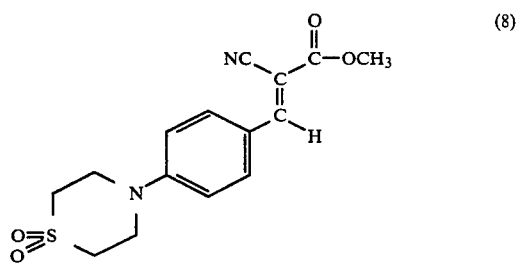

The polyesters of the invention are conveniently prepared by any of the known polycondensation techniques, e.g., solution polycondensation or catalyzed melt-phase polycondensation; for example, by the transesterification of dimethyl terephthalate and dimethylglutarate with 1,2-propanediol and glycerol in the presence of a methine dye of Formula (3). The polymers can be prepared by known two-stage polyesterification procedures, such as described in U.S. Pat. Nos. 4,140,644 and 4,217,400, the latter being especially directed to the control of branching in polyesterification. The dye, glycols and the carboxylic acids (or their ester equivalents) are heated with a branching agent, such as a triol or triacid (or their functional equivalents), and a transesterification catalyst in an inert atmosphere. Suitable temperatures are in the range of about 190° to about 280° C., and preferably about 200° to about 260° C. Thereafter, a vacuum is applied, and heating is continued, for example, at a temperature in the range of about 220° to about 240° C., to build up the molecular weight.

If desired, the degree of polyesterification can be monitored by measuring the inherent viscosity (i.v.) of samples periodically taken from the reaction.

After reaching a desired inherent viscosity and fusing point, the polyester resin product is cooled and isolated. Characteristically, the polyester resin is thermoplastic and amorphous.

When a difunctional dye is utilized, one presently preferred subclass of polyesters of this invention comprises residues derived from the polyesterification of a polymerizable monomer composition comprising:
about 0.0/100.0 to about 99.9/0.1 mole ratio of dimethyl terephthalate based on the total acid monomers;
about 10.0/90.0 to about 100.0/0.0 mole ratio of 1,2-propane diol based on the total hydroxy monomers;
about 0.0/100.0 to about 90.0/10.0 mole ratio of additional glycol based on the total hydroxy monomers; and about 0.1/99.9 to about 100.0/0.0 mole ratio of at least one methine compound of Formula (3) above based on the total acid monomers.

Another preferred subclass of polyesters of this invention comprises residues derived from the polyesterification of the preceding polymerizable monomer composition which additionally contains:

about 5.0/95.0 to about 25.0/75.0 mole ratio of dimethylglutarate based on the total acid monomers; and
about 1.0/98.5 to about 10.0/85.0 mole ratio of glycerol based on the total hydroxy monomers.

A polyester of the present invention, and toner particles of the present invention derived therefrom, can contain about 0.1/99.9 to about 100.0/0.0 mole ratio of ultraviolet light absorbing residues incorporated as an integral part of the polymer backbone structure per 100 mole ratio of all acid or hydroxy monomer residues of polymerized compounds present in the polyester, and preferably about 0.5/99.5 to about 50.0/50.0 mole ratio. These ultraviolet light absorbing residues are derived from at least one methine compound of Formula (3) above.

Toner particles can be prepared from such polyesters by any convenient procedure.

In one preferred procedure, after cooling and solidifying, a solid polyester is crushed and then coarsely ground in a mill. Thereafter, the coarsely ground polymer is further pulverized or ground to produce a toner particle size, or size range, as desired. One suitable grinding means is a fluid energy or air jet mill, such as described in U.S. Pat. No. 4,089,472, although other methods and apparatus for grinding solid resins can also be used. Particles can be classified by conventional procedures if desired.

Then, depending upon whether a liquid or dry toner developer is desired, the resulting particles are optionally mixed in appropriate ratios with one or more additives, such as with a carrier liquid when a liquid toner developer is desired, or with solid, finely divided additive particles when a dry developer is desired. Additives can either be admixed or blended with preformed polymer particles, or intermixed into the polymer matrix of individual particles by, for example, using conventional heated compounding rolls, or the like. Examples of additives which can thus be melt blended with polyester particles include colorants (dyes or pigments), charge control agents, and the like.

The polyester resins of this invention are preferably sufficiently brittle to permit their being ground to very small particle size, and such brittleness facilitates the crushing and intermediate grinding procedures that usually precede a final grinding operation.

In general, toner particles used in dry toner compositions of this invention can fall in the size range of about 1 to about 50 microns in average diameter. Toner particles in the size range of about 2 to about 20 microns in average diameter are presently preferred.

The colorant can be selected from among a wide variety or range of dyes and/or pigments. Useful colorants (including black) are described in many patents. See, for example, U.S. Pat. Nos. 4,140,644; 4,416,965; 4,414,152; and 2,229,513. The concentration of colorant in a toner composition can vary over a wide range; for example, such can be in the range of about 0.5 to about 20 weight percent, with a range of about 1 to about 6 weight percent being presently preferred, on a total composition basis.

The charge control agents can be an ionic compound, such as an ammonium or phosphonium salt, or the like. Examples of suitable charge control agents are disclosed in U.S. Pat. Nos. 3,895,935; 4,079,014; 4,323,634; 4,394,430; 4,496,643 and in British Patent Nos. 1,501,065 and 1,420,839. Only a small concentration of charge control agent normally is used in the toner composition, such as in the range of about 0.05 to about 5 weight percent, and preferably about 0.2 to about 2.0 weight percent on a total composition basis.

The toner compositions of the present invention are capable of forming high resolution, visible images from electrostatically produced latent images formed on photoconductive surfaces.

Toner compositions of the present invention also generally have good cohesivity and resist toner offset and are heat fusible at relatively low temperatures (i.e., at temperatures below about 175° C.).

Liquid toner compositions of this invention are liquid dispersions wherein a toner composition of this invention is dispersed in an electrically insulating carrier liquid. Additives can be present in small amounts in the liquid composition, including colorants, stabilizing agents, surfactants, waxes, and the like. Examples of such additives and techniques for their incorporation into developers are described, for example, in U.S. Pat. Nos. 3,849,165; 4,229,513; 3,788,995; 4,415,299; and 4,659,640.

One method for preparing a liquid toner composition involves milling toner particles in a solvent such as Isopar G ™ (a brand of high purity mixed isoparaffinic materials marketed by Exxon Corp.). A quantity of the polyester resin is optionally first melt compounded on a two roll mill with additives such as pigments and the like. The resulting melt concentrate is then pulverized in a Wiley Mill ™ (a brand of pulverizer marketed by Arthur H. Thomas Company, Philadelphia, Pa.), or the like, until an average particle size less than about 1 mm is produced. The pulverized polymer particles are then ballmilled preferably with dispersing aids, such as described, for example, in U.S. Pat. No. 4,659,640, to form a concentrate of toner particles having a average particle size that is preferably less than about 1 micron. A liquid developer is then made by dispersing the toner particle concentrate in a volatile carrier liquid.

The carrier liquid is characterized by a low dielectric constant that is preferably less than about 2.5, and by a high electrical resistance that is preferably greater than about $10^{10}$ ohm-cm volume resistivity. Examples of suitable carrier liquids include halogenated hydrocarbons, such as trichloromonofluoromethane, and the like; hydrocarbons, such as isoparaffins having a boiling point in the range of about 145° to about 185° C., such as Isopar G ™, and the like; cyclic hydrocarbons, such as cyclohexane, and the like; odorless mineral spirits; hydrocarbons, such as octane; and the like.

On a 100 weight percent total basis, a liquid composition can contain about 5 to about 50 weight percent solids with the balance up to 100 weight percent being carrier liquid.

The dry and liquid toner compositions of this invention can be used in electrophotographic processes for making positive transparencies of images in processes not requiring the use of light sensitive materials, such as dielectric recording materials. These toner compositions are useful for developing charge patterns on photoconductive surfaces which are then transferred to transparencies or transparent substrate sheets, such as are used in conventional photolithographic plate making procedures. A toner composition is bonded to a transparent substrate by conventional techniques.

Toner compositions of this invention can be prepared wherein the ultraviolet dye that is incorporated with the polyester resin is uniformly distributed through the composition even though the toner composition itself employs a mixture of at least two different polyester resins each of which contains a different amount of incorporated dye. Even a polyester resin containing no incorporated methine dye can be used, if desired, for solvent purposes or the like. One can employ either the polymer limited coalescence preparation procedure or the evaporative limited coalescence preparation procedure as taught in U.S. Pat. No. 4,833,060 to prepare the polymers of the present invention.

The evaporative limited coalescence method, for example, permits the addition of small amounts of a dye rich polyester copolymer to a dye-free polyester polymer to obtain a desired dye level in a blend of polyester polymers. This feature is not only economical, but also readily lends itself to adjusting the ultraviolet light absorbing dye concentration to a desired level in a toner composition without having to synthesize a polymer having a specified dye content.

In a toner composition of the present invention, it is presently preferred to have a dye content in the range of about 0.5 to about 20 weight percent and preferably about 1 to about 6 weight percent. While this dye content can be achieved by using a single dye-containing polyester polymer having the desired dye content, it is presently preferred to blend proportions of at least one polyester polymer containing a relatively low dye content (or perhaps no dye at all) with at least one polyester containing a relatively high dye content.

Thus, a toner composition of this invention can be prepared from polyester polymers containing structurally incorporated dyes by compounding procedures or by coalescence procedures. Neither of these preparation procedures can be practiced in a toner preparation process where molecular dyes are merely admixed into a composition because of problems of dye crystallization and dye surface active capacity. The latter, for example, can adversely affect toner triboelectric behavior.

A toner composition used in this practice of this invention should have a total transmission density of at least about 3 for a stack height of about 10 microns on a substrate. For purposes of this invention, total transmission density is measured using a Lambda 3 VV/VIS spectrophotometer marketed by Perkin-Elmer. Also for purposes of this invention, "stack height" means the average thickness of a layer of toner composition that is bonded to a substrate surface, as in an image formed with such a toner composition upon a transparent substrate. Such a transmission density ensures that defects in a printing plate made with a transparency of this invention are not introduced by the penetration of some light through the toner area of a transparency. Usually a total transmission density of less than about 12 is employed in a transparency made in accordance with the teachings of this invention. Preferably, the total transmission density is in the range of about 3 to about 8.

The presence of methine dyes such as those of Formula (3) in a polyester comprising toner particles does not change or substantially increase the pigment concentration required in a toner composition for light absorption reasons, and does not make toner composition compounding with a pigment or the like any more difficult than in the preparation of prior art toner compositions.

The Lithographic Plate Making Process

Using a toner composition prepared as above described, a positive transparency is eletrophotographically prepared from a photocomposition. If desired, electronically generated inputs can be used. The positive transparency has an image formed on one face thereof which is comprised of the toner composition.

The process of making a positive transparency involves, electrostatically transferring toner from photoconductor film to a transparent receiver. The transparent receiver is a self-supporting, flexible layer or film capable of withstanding fusing conditions. Preferred such film materials are comprised of cellulose acetate, polycarbonates, or polyesters including, polyethylene terephthalate. The transferred toned area is fused to the receiver. Normally low fusing temperatures are preferred so that dimensional changes in the transparency material are minimal. Preferred temperatures are below 150° C.

The positive transparency has high contrast characteristics. The present process provides a process whereby only a relatively small portion of an imageable photoconductor element is exposed during imaging so that data compression is achieved. Also, when transferring the resulting toned image from the photoconductor element to the transparency receiver, the lack of large solid areas results in excellent image quality, such as is desired, and even necessary, for photolithographic plate making.

Thereafter, the positive transparency is used to make a lithographic plate. Either positive-working or negative-working lithographic plates can be used.

Examples of positive-working plates include Kodak Long Life Positive Lithoplates, and the like.

Examples of negative-working such plates include Kodak Long Life Negative Lithoplates, and the like.

The Positive Transparency

A transparency provided by the present invention comprises a self supporting, flexible transparent support layer or film on one face of which a toned, permanent image is adhered.

The support layer or transparent film can be any transparent material heretofore used in the art of photolithography for transparent negatives and positives. Preferred such film materials are comprised of cellulose acetate, polycarbonates, or polyesters, including polyethylene terephthalate.

The image on the support layer is comprised of a bonded toner composition of this invention.

The invention is illustrated by the following examples:

EXAMPLE 1

Dye Monomer Absorption and Polymer Preparation

The absorption spectrum of the methine dye of Formula (7) is measured with a spectrophotometer. The lambda maximum ($\lambda_m$) was found to be 373.7 nm.

A polyester polymer of this compound is prepared as follows:

A mixture of 83.74 g (0.43125 mol) of dimethyl terephthalate, 10.41 g (0.065 mol) of dimethyl glutarate 1.093 (0.00375 mol) of the methine compound of Formula (7) (above), 2.30 g. (0.025 mol) of glycerol and 53.27 g. (0.70 mol) of 1,2-propanediol was placed in a polymer flask with catalytic amounts of Zn(OAc)$_2$.2-H$_2$O and Sb$_2$O$_3$. The flask was fitted with a Vigreax-Claisen column, nitrogen inlet tube and the flask side arm was sealed. The mixture was then heated in a 220° C. bath for 2 hours and subsequently at 240° C. for 1 hour with N$_2$ bubbling through the melt. The column was then removed and the flask side arm was opened. Heating at 240° C. with N$_2$ bubbling through the melt was continued for another 50 minutes. The N$_2$ inlet tube was replaced with a metal blade stirrer and the system was slowly placed on reduced pressure (0.25 mm) with stirring. After 45 minutes, the polymer was cooled and isolated. The inherent viscosity was determined to be 0.17 in methylene chloride. The T$_g$ was 61.5° C.

The polymer contained the following moieties:

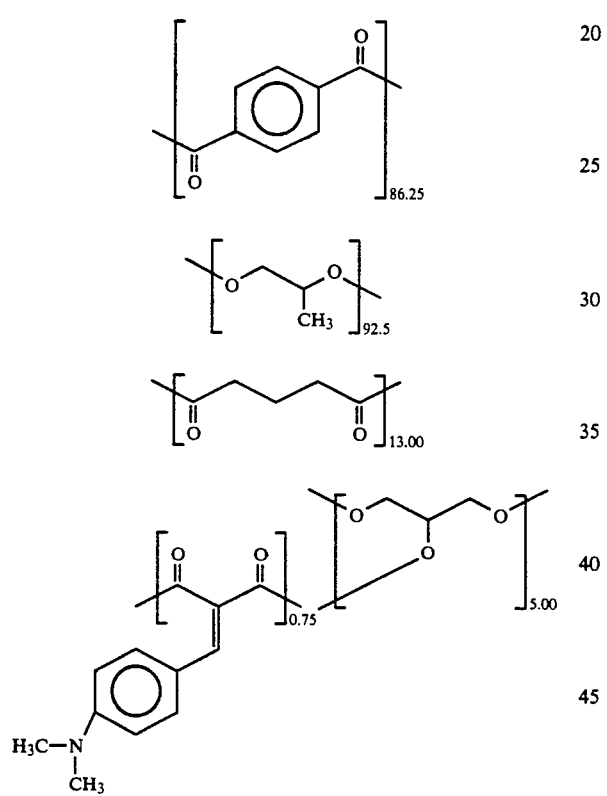

EXAMPLE 2

Dye Monomer Absorption and Polymer Preparation

The absorption spectrum of the methine dye of Formula (8) above is measured with a spectrophotometer. The lambda maximum ($\lambda_m$), or maximum spectral absorption peak was found at 393.9.

A polyester polymer of this compound is prepared as follows:

A mixture of 62.28 g (0.3207 mol) of dimethyl terephthalate, 7.71 g (0.04814 mol) of dimethyl glutarate, 0.89 g (0.002778 mol) of the methine compound of Formula (8), 39.44 g (0.51827 mol) of 1,2-propanediol, and 1.71 g (0.01857 mol) of glycerol was placed in a polymer flask with catalytic amounts of Zn(OAc)$_2$.2H$_2$O and Sb$_2$O$_3$. The polymer was prepared as in the previous example except that the vacuum stage was maintained for 70 minutes. The inherent viscosity was determined to be 0.51 in methylene chloride. The T$_g$ was 66.3.

The polymer contained the following moieties:

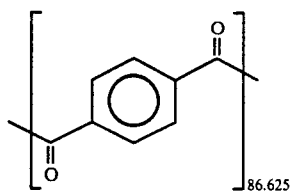

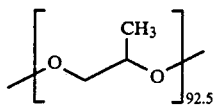

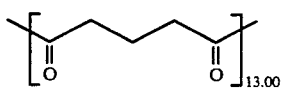

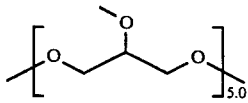

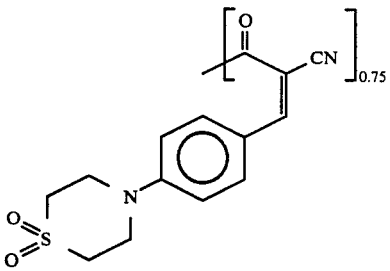

EXAMPLE 3

Polymer Preparation

Another polyester polymer derived from the methine dye of Formula (7) is prepared as follows:

A mixture of 9.71 g (0.05 mol) of dimethyl terephthalate 14.57 g. (0.05 mol) of the methine compound of Formula (7) (above), and 10.65 g (0.14 mol) of 1,2-propanediol was placed in a polymer flask with catalytic amounts of Zn(OAc)$_2$.2H$_2$O and Sb$_2$O$_3$. The polymer was prepared as in the previous examples except the vacuum stage was conducted for 1 hour. The inherent viscosity was determined to be 0.11 in methylene chloride. The T$_g$ was 70.4° C.

The polymer contained the following moieties:

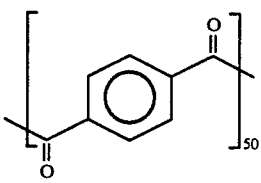

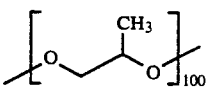

-continued

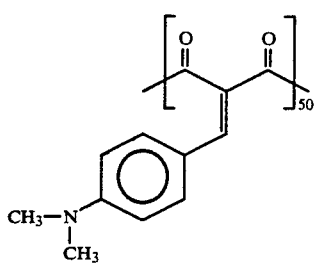

EXAMPLES 4 and 5

Toner Powder Preparation and Properties

Each of the respective polyesters of Examples (1) and (2) was then compounded with the additives shown in Table II below and ground.

TABLE II

| Toner Powder Composition | |
|---|---|
| Component | wt. % (total dry basis) |
| Polyester Polymer[1] | 92.5 |
| "Regal 300"[2] | 6.0 |
| "CA"[3] | 1.5 |

[1]The polyester polymer contained a 0.75/99.25 mole ratio of difunctional methine dye and 0.75/99.625 mole ratio of monofunctional methine dye.
[2]"Regal 300" is a trademark of the Cabot Corporation for a brand of carbon black
[3]"CA" is N,N-dimethyl-N-octadecylbenzylammonium chloride.

The electrophotographic characteristics of the two toners were measured and found to be as shown in Table III below.

The developed images from each of these toner compositions was found to transfer with high efficiency from an imaged photoconductive surface to a regular and high-quality photographic paper, transparencies, metal sheets and electrostatic paper using a modular copier which performs essentially all operations in an electrophotographic cycle in an image-wise fashion.

TABLE III

| Electrophotographic Characteristics | | | | | |
|---|---|---|---|---|---|
| Toner Composition | Polymeric Dye of Example | Q/M ($\mu$Coul/g) | % T.C. | Throw-Off T.O. (mg) | Size #/Vol. |
| Ex. 4 | (2) | 45.4 | 5.0 | 0.4 | 6.2/9.7 |
| Ex. 5 | (1) | 51.1 | 4.8 | 0.3 | 7.1/11.8 |

EXAMPLE 6

Determination of Transmission Densities

For the purpose of determining the transmission densities of the toner compositions of Examples 4 and 5, bias developed laydowns were obtained using a single use photoconductor at various bias voltages at a constant gap of "0.020".

The data was obtained for each toner composition using a spectrophotometer sensitive to visible and ultraviolet light over the wavelength range of 300 to 700 nm.

For comparison and control purposes, data was also obtained for a prior art toner composition using the same spectrophotometer. The prior art toner composition comprised polyester particles that contained no methine or other dye. The toner contained 6 pph Regal 300, 1.5 pph Charge control agent and 92.5 pph cross-linked styrene/acrylate copolymer.

In these evaluations, the approximate area of the patch developed was 120 cm$^2$. Thus, a 100 mg. laydown of toner translated into a 12 micron thick stack height, and a 50 mg laydown of toner translated into a 6 micron thick stack height.

For each of these toner compositions the transmission density was plotted as a function of milligrams of composition deposited on a film.

An absorption spectrum representative of the prior art toner composition is observed to be essentially flat in the 350 to 700 nm wavelength region.

An absorption spectrum representative of the toner composition of Example 5 which contained incorporated therewith the methine dye of Formula (7) is observed to show a definite increase in absorption in the 350 to 400 nm wavelength region.

An absorption spectrum representative of the toner composition of Example 4 which contained incorporated therewith the methine dye of Formula (8) was observed to be similar to that for the toner composition of Example 5.

For each of the toner compositions of Example 5 and the toner composition of the prior art, the transmission density was plotted as a function of milligrams of toner deposited on a film. From the results, it is clear that the increase in the transmission density has been achieved for the toner composition of Example 5 compared to the prior art toner composition by the incorporation of only 0.75/99.25 ratio of ultraviolet light absorbing difunctional methine dye into a polyester polymer suitable for use as a toner polymer and used in a 12 micron stack height.

The toner composition of Example 4 was similarly evaluated, but the results obtained, though indicating an acceptable transmission density, were not as promising as those obtained with the toner composition of Example 5.

EXAMPLE 7

Preparation of Toner by Evaporative Limited Coalescence

A 50/50 mole ratio polyester copolymer containing the methine dye of Formula (7) was prepared by following the procedure of Example 3. This copolymer was then admixed with the dye free polyester copolymer to form a mixture.

Two separate preparation methods were then each followed for preparation purposes.

Method a

In a 500 ml jar equipped with a magnetic stir bar was placed, ethyl acetate (372 g) and 0.4 IV branched polyester (93 g), Regal 300 (6 g), N,N-dimethyl-N-octadecylbenzylammonium chloride (0.2 g) and uv dye polymer from Example 3, 1 g). The dispersion was stirred for 17 hours on a stir plate. The aqueous was made up of VWR buffer pH$_4$ (1500 mls), Nalcoag 1060 (45 mls), and poly(adipic acid-comethylaminoethanol) (13 mls, 10%). The organic phase was poured into the homogenized aqueous phase, stirring was continued for 3-4 minutes. The coarse dispersion was put through the Microfluidizer (40 psi) and into a 3 liter, 3 neck, round bottom flask equipped with a paddle stir. The flask was capped until addition was complete, and stirring maintained at 100 RPM. The caps were removed, a nitrogen sweep was added, and stirring continued for 17 hours.

An aspirator was attached and the dispersion stirred under vacuum for 3 hours. The vacuum was removed and the dispersion filtered through a coarse screen, the pH was adjusted to 7 with 1N KOH. The filtrate was collected on a filter funnel equipped with a medium porosity frit, washed with distilled water until the filtrate was clear, slurried in 0.1N KOH for 17 hours, collected on a medium frit filter funnel, washed with distilled water until neutral pH, tray dried for 48 hours and sieved through 140 mesh screen.

Method b

In a 3 L round bottom flask equipped with a paddle stirrer was placed ethyl acetate (1600 g), 387.9 g of a mixture containing 94% 0.4 IV branched polyester, 6% Regal 300, and 0.2 pph, N,N-dimethyl-N-octadecylbenzylammonium chloride. To this was added a styrene-methacrylic acid copolymer containing 99% sytrene (4 g), and polyester uv dye (8 g). The dispersion was stirred for 17 hours.

The aqueous phase was made up of citric acid buffer pH4 (6000 mls), Nalcoag 1060 (164 mls), and poly(adipic acid-co-methylaminoethanol) (48 mls, 10%). The organic phase was poured into the homogenized aqueous phase, agitation was continued for 10 minutes. The coarse dispersion was put through the Microfluidizer (40 psi) and into a capped 12 L, 3 neck, round bottom flask equipped with a paddle stirrer. The flask was kept capped for two hours after addition was complete to ensure the particles would be irregularly shaped on evaporation. A nitrogen sweep was attached and evaporation was continued for 17 hours. An aspirator vacuum was applied for 5 hours. The particles were collected on a medium frit filter funnel and washed four times with water. The particles were slurried in 0.1N KOH for 17 hours, collected on a medium frit filter funnel and washed to neutral pH with water. The wet cake was dried at 45° C. for 18 hours.

Successful limited coalescence was achieved using each of preparation methods (a) and (b). It was observed that neither preparation method (a) nor (b) interfered with the process of limited coalescence and no effect from the potassium hydroxide wash was observed on the ultraviolet light absorbing capacity of the copolymer.

EXAMPLE 8

Identifying Quantity of Dye Needed

For the purpose of identifying the amount of dye required, three toner composition samples were prepared which contained, respectively, 1, 2, and 3 percent of the 50/50 mole ratio copolymer concentrate prepared in Example 7.

In FIG. 6, the results from a Lambda 3 VV/VIS spectrophotometer from Perkin-Elmer are plotted for the respective samples which contained 1 and 3 percent of the 50/50 concentrate copolymer.

From the data, it was found that at a stack height of 10 microns, a total transmission density of greater than 6 could be achieved. This transmission density greatly exceeds the minimum requirement for a toner composition with ultraviolet light absorption capability for use in a xerographic type transparency process suitable for application in lithographic plate making.

To correctly identify the amount of concentrated dye containing polyester copolymer that is needed for the intended application, a set of calibration curves were generated.

The invention has been described in detail with particular reference to preferred embodiments thereof, but it will be understood that variations and modifications can be effected within the spirit and scope of the invention.

We claim:

1. A toner composition for imaging a photolithographic transparency comprising on a 100 weight percent basis:

(a) about 80.0 to about 99.5 weight percent of at least one polyester which contains incorporated into the polymer structure thereof about 0.1/99.9 to about 100.0/0.0 mole ratio based on the total acid or hydroxy monomers of at least one methine dye having a spectral absorption peak in the range of about 300 to about 450 nm and the formula:

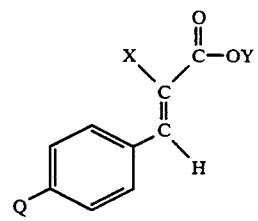

wherein,

Y is a lower alkyl radical;

X is selected from the group consisting of —CN and

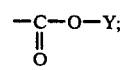

and

O is selected from the group consisting of —NH2 —NHY, —N(Y)2 and

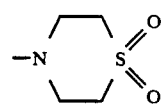

(b) about 0.5 to about 20 weight percent of at least one pigment; and
   (c) about 0.05 to about 5 weight percent of at least one charge control agent, wherein the toner composition has a total transmission density of at least about 3 at a stack height of 10 microns.

2. The toner composition of claim 1 wherein the polyester, pigment and charge control agent are in the form of particles in the size range of about 1 to about 30 microns.

3. The toner composition of claim 1 which additionally contains about 80 to about 99.5 weight percent of at least one dye-free polyester.

4. The toner composition of claim 1 wherein the transmission density is in the range of about 3 to about 6 at said stack height.

5. The toner composition of claim 1 wherein said polyester is characterized by having (1) an inherent viscosity in the range of about 0.05 to about 0.8 in methylene chloride solution at a concentration of 0.25 grams of said polymer per 100 milliliters of said solution;

(2) a glass transition temperature in the range of about 50° to about 120° C.; and (3) a fusing point in the range of about 65° to about 200° C.

6. The toner composition of claim 1 wherein the methine dye is characterized by the formula:

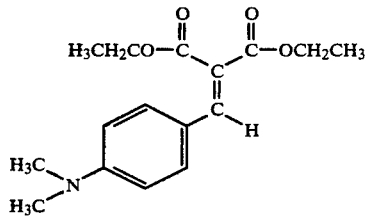

7. The toner composition of claim 1 wherein the methine dye is characterized by the formula:

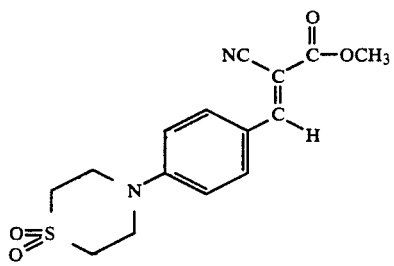

8. A positive transparency comprising:
  (a) a self-supporting, flexible transparent support layer having opposed faces; and
  (b) a toned image formed on one of said faces and adhered thereto, said image comprising a toner composition of claim 1.

9. A process for making a lithographic plate comprising the steps of:
  (A) electrophotographically forming a positive transparency whose image is formed from a toner composition which comprises on a 100 weight percent basis:
    (1) about 80.0 to about 99.5 weight percent of at least one polyester which contains incorporated into the polymer structure thereof about 0.1/99.9 to about 100.0/0.0 mole ratio based on the total acid and hydroxy monomer of at least one methine dye having a spectral absorption peak in the range of about 300 to about 450 nm and the formula:

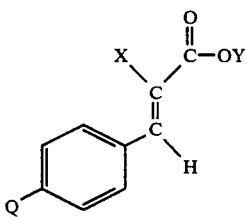

wherein,

Y is a lower alkyl radical;

X is selected from the group consisting of —CN and

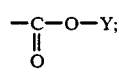

and

Q is selected from the group consisting of —NH$_2$ —NHY, —N(Y)$_2$ and

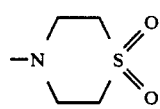

(2) about 0.5 to about 20 weight percent of at least one pigment; and
  (3) about 0.05 to about 5 weight percent of at least one charge control agent, wherein the toner composition has a total transmission density of at least about 3 at a stack height of 10 microns wherein said toner composition has a total transmission density of at least about 3 at a stack height to 10 microns;
  (B) imaging a positive.working lithographic plate which is sensitive to incident light; and
  (C) developing the exposed plate.

* * * * *